United States Patent [19]

Schmid et al.

[11] Patent Number: 4,823,423
[45] Date of Patent: Apr. 25, 1989

[54] STREET SWEEPING APPARATUS

[75] Inventors: Max Schmid, Pocking; Peter Lex, Griesbach, both of Fed. Rep. of Germany

[73] Assignees: Linnhoff GmbH, Pocking; Saku Maschinenbav A. Schmid, Winsen, both of Fed. Rep. of Germany

[21] Appl. No.: 34,556
[22] PCT Filed: Apr. 8, 1986
[86] PCT No.: PCT/EP86/00208
§ 371 Date: Dec. 8, 1986
§ 102(e) Date: Dec. 8, 1986
[87] PCT Pub. No.: WO86/06120
PCT Pub. Date: Oct. 23, 1986

[30] Foreign Application Priority Data

Apr. 9, 1985 [DE] Fed. Rep. of Germany ....... 3512730

[51] Int. Cl.⁴ .............................................. F01H 1/04
[52] U.S. Cl. ..................................................... 151/83
[58] Field of Search ................. 15/83, 84, 85, 87, 340, 15/348

[56] References Cited

U.S. PATENT DOCUMENTS

| 3,087,187 | 4/1963 | Hank et al. | 15/340 |
| 3,189,932 | 6/1965 | Daneman | 15/340 |
| 3,243,834 | 4/1966 | Trapp | 15/340 |

FOREIGN PATENT DOCUMENTS

| 925777 | 3/1955 | Fed. Rep. of Germany | 15/83 |
| 2326241 | 12/1974 | Fed. Rep. of Germany | 15/340 |
| 2845212 | 10/1979 | Fed. Rep. of Germany | 15/83 |
| 824160 | 11/1959 | United Kingdom | 15/83 |

Primary Examiner—Edward L. Roberts
Attorney, Agent, or Firm—Roberts, Spiecens & Cohen

[57] ABSTRACT

A street sweeping apparatus with a sweeping device (10), a sweepings container (6) and a pickup device (2) for feeding the sweepings from the street into the sweepings container (6). The street sweeping apparatus is characterized in that the sweeping device (10) and the pickup device (6) are parts of vehicle (1) suitable for use in normal traffic and the pickup device (2) is an independent unit, which can be detachably joined to the vehicle (1) for travel therewith. The intake opening of the housing (11) of the pickup device (2) is at the level of the street at the rear of the sweeping device (1) and the transfer opening of this housing (11) is connected in a dust-tight manner with the intake opening of the sweepings housing (6). Sweeping rollers (12 and 13) which mesh with each other in the manner of gear wheels are rotatably supported in the housing (11) to take up the sweepings and feed them to the sweepings container (6). The drive for the rollers (12 and 13) is obtained from the drive of the vehicle (1).

17 Claims, 4 Drawing Sheets

STREET SWEEPING APPARATUS

FIELD OF THE INVENTION

The invention relates to a street sweeping apparatus comprising a container for the sweepings and a pickup device for moving the sweepings from the street surface into the container.

DESCRIPTION OF PRIOR ART

A sweeping machine with these basic features is described in the German unexamined specification No. 2,326,241, in which the sweepings container is mounted on a dual purpose frame, which also bears the pickup device, and comprises longitudinal and transverse girders and may be used either to carry the container or a flatbed body so that the vehicle may be used as a standard truck. The frame also supports a sweeping device which has independent wheels for supporting it on the ground. The pickup device is a suction system whose suction truck has one end placed over the ground in the immediate vicinity of the sweeping device and whose other end is connected with the sweepings container. The aim of this construction is to arrange the sweepings container, the sweeping device and the pickup device in the form of a suction apparatus, as a self-contained unit, which may be dismounted from the vehicle by releasing fasteners between the frame and the vehicle so that the vehicle may then be used as a general purpose vehicle, as for example for transporting material to be spread on the road. Although this construction does make it possible for the vehicle to be rapidly converted for different applications, the subassembly carried by the frame has a large number of parts and is complex so that repairs and service operations thereon can only be performed slowly and require much labor. Accordingly, the pickup device is a suction device which although it is relatively expensive in the first place later gives little trouble. A further inherent feature of the construction is that the parts on the frame have their own drive which is independent of the drive of the vehicle.

SUMMARY OF THE INVENTION

The object of the invention is to provide a street sweeping apparatus which is compact, readily maneuvered and highly efficient, and which is simple to service. The apparatus is to be made up of such parts which may be so fitted together that in view of its operational advantages the apparatus may be produced at a low cost and can be serviced and repaired in short times. There are also a series of further features of the invention which are of considerable utility in other respects in addition to this purpose.

In accordance with the invention the sweeping device and the sweepings container are arranged independently of the vehicle, whereas the pickup device is a purely mechanical device which may be simply mounted on the vehicle and detached therefrom. In this respect, the street sweeping apparatus constitutes a compromise between a highly specialized, single-purpose vehicle as is frequently the case with sweepers, and a vehicle of the initially mentioned type. More especially, the sweepings container is a separately connectable and disconnectable part which may be simply mounted and detached without any particular trouble, whereas a pickup device of the type employed in the prior art has many parts and accordingly makes the vehicle complicated as its parts had to be separately attached to the vehicle. In this respect, it is an advantage if all the parts are united together as a single unit which may be attached and detached as a whole. The use of a purely mechanical pickup device leads to a whole series of advantages as compared with a pneumatic pickup device, including especially the reduced effects on the environment and the possibility of using conventional, and therefore readily, replaceable parts.

Although a pickup which is in some respects similar to that of the present invention has been described in the German unexamined specification No. 2,364,022, in the present invention the sweeping rollers of the pickup device mesh with each other like gear wheels, whereas the sweeping rollers in the aforesaid German specification make use of centrifugal force for feeding the sweepings and there is no sweeping device placed in front of the pickup device in this earlier system. This feature of the known device is present because the device is special-purpose sweeping apparatus for taking up grass and like material to be cleared, whereas the sweeper in accordance with the present invention is suitable for normal dirt and litter which cannot be swept without producing clouds of dust.

BRIEF DESCRIPTION OF THE FIGURES OF THE DRAWING:

The invention will now be described in more detail with reference to the preferred embodiment thereof illustrated in the drawing.

DETAILED DESCRIPTION OF A PREFERRED EMBODIMENT

Figure 1:
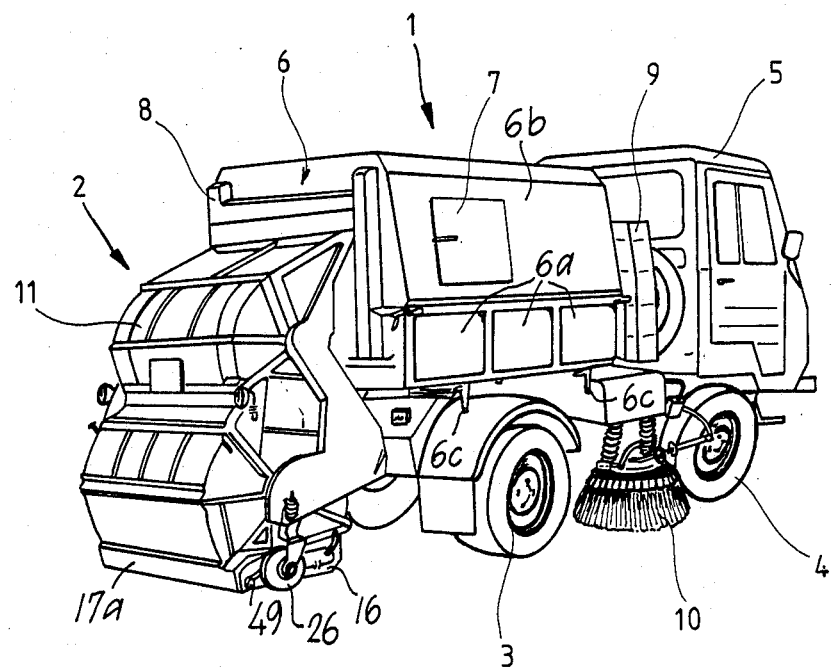
FIG. 1 is a perspective view of the entire street sweeping machine according to the invention.
Figure 2:
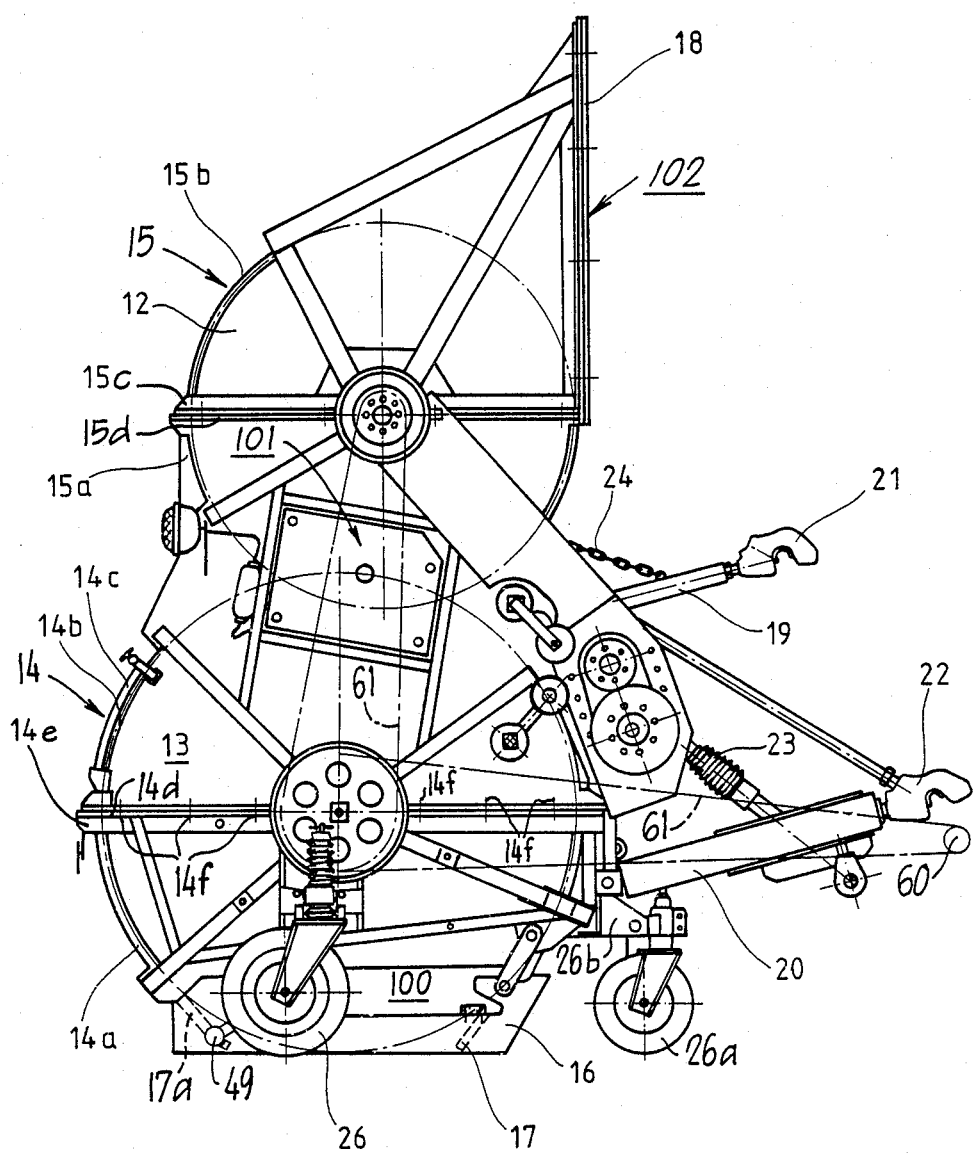
FIG. 2 is a side view on a larger scale of the pickup device of the present invention as used in the street sweeping apparatus shown in FIG. 1.

The main parts of the street sweeping machine of the invention are a vehicle 1, which may be in the form of a small motor vehicle, and a separate pickup or loading device 2, which normally is united with the motor vehicle, although it may be detached from it without involving much labor, time and special tools. It may then be mounted on some other suitable vehicle. The motor vehicle has two driver rear wheels 3 on a common axle and two steered front wheels 4 on a common axle. The operation of the vehicle takes place from a driver's cab, which is arranged over the engine which not only serves to drive the rear wheels 3 but also subsidiary units by means of a power take off shaft; more particularly, the engine serves to power the pickup device. On the flatbed body of the motor vehicle there is a container 6 to receive the collected sweepings. There is a side opening, normally closed by a door 7, for access to the collected sweepings in the container 6. More particularly, the sweepings container 6 has an input opening in its rear wall which is delimited by a connection frame for the pickup device 2 and the rear wall of the container 6 is reinforced by a surrounding support assembly 8. The input opening makes it possible for the container 6 to be loaded when the pickup device is mounted. To unload the container 6 like a tipping truck, the container is mounted so that it may be power-tilted about a longitudinal axis and one side wall is made up of a lower door 6a which may be folded down about a lower longitudinal axis and of an upper side wall part 6b which is a fixed part of the container 6. When the vehicle is operational, the door 6a is folded upwards and latched to the upper side wall part 6b by fasteners 6c so that the container 6 is closed, apart from the rear input opening. In order to empty the container 6, after releasing the fasteners 6c, the lower side door 6a is folded downwards so that as the container 6 is tipped sideways, the sweepings slide down through the opening uncovered by the door 6a out of the container 6. In order to facilitate emptying, and to provide for a large discharge opening, it is also possible for the top part of the side wall to be in the form of a door which is opened at the same time as the door 6a. For reasons of simplicity of design, it is preferred for discharge to take place only to one side, although it is quite feasible to design the two sides of the container 6 alike so that the container may be tipped to either side. In every case it is only the container 6 which is tipped whereas the driver's cab 5 and generally the pickup device 2 remain in their respective positions.

It is preferred to use the apparatus of the invention in connection with a vehicle with a flatbed having low walls, in which the door 6a constitutes one of the sides and the upper part of the container 6 is placed on the upper edges of the sides and the front upright wall, whereas the pickup device 2 is mounted after mounting or modifying the tailgate. It is thus possible for a relatively conventional vehicle to be converted for use in the invention.

Between the sweepings container 6 and the driver's cab 5, a water tank 9 is arranged from which water may be supplied to counteract the swirling up of dust, when the machine is operating, by spraying on the zone in the process of being swept. If appropriate the water tank 9 may be arranged at some other position on the vehicle, more particularly for reasons of improving the weight distribution between the axles of the vehicle. Thus it may be convenient to arrange the water tank 9 in front of the driver's cab 5 on the vehicle chassis. In other cases it may well be expedient to mount the water tank 9 within the sweepings container 6 and to have it extend so far towards the back wall of the driver's cab 5 as is possible having regard to the motion of the container 6 in relation to the driver's cab 5 when tipping of the container 6 is in progress. This design not only has practical advantages but also endows the vehicle with a particularly satisfactory design as regards appeal to the eye.

The sweeping gear of the machine is characterized by the provision of two plate-like brushes 10, which run in opposite directions, are arranged symmetrically with respect to the vertical median plane of the vehicle and are rotated about their upright axes by a drive means powered by the vehicle engine and able to be turned off without stopping the engine. The plate-like brushes 10 are able to be set at different heights in order to take into account the condition of the street surface and the degree of wear of the bristles. Their position is also able to be adjusted in the transverse direction of the vehicle in order to project a suitable distance past the side of the vehicle during use and to be retracted inwards within the outline of the vehicle when they are not in use. In the median plane of the vehicle, i.e. midway between the plate-like brushes, there is a trap bar (not shown) for the sweepings moved by the brushes towards the middle. This trap bar is inherently sufficiently so elastic that when it rests on the street surface it is able to accomodate bumps in the surface within certain limits, while on the other hand it is laterally stable to the required degree. The plate-like brushes cooperate with the trap bar in sweeping the litter and dirt on the street in the operational path of the vehicle into a small elongated mound under the sweeping machine.

The sweepings in the form of this continuous mound are then taken up by the pickup device 2 and transferred to the sweepings container 6.

At least two brush rollers 12 and 13 are pivotably supported by bearings in the side walls of the housing 11 of the pickup device 2. The brush rollers are arranged one over the other. The upper brush roller 12 is smaller in diameter than the lower brush roller 13. The brush rollers are so set on their shafts that the rows of bristles on one brush roller are opposite, and penetrate into, respective gaps between the rows of bristles on the other brush roller in the manner of gear teeth. The lower brush roller 13 rotates so that its lowermost bristles move in the same direction as the vehicle and take up the sweepings from the street and filing them upwards at the top of the brush roller through the transfer opening into upper brush roller 12, which then throws the sweepings at its highest point into the container 6. The speeds of rotation of the brush rollers 12 and 13 are suitably matched in relation to each other to make it possible for these functions to be performed.

Each of the two brush rollers 12 and 13 is arranged in one of two generally cylindrical housing components 14 and 15, respectively. The lower part-cylindrical housing component 14 has an intake opening 100 whose leading edge is a short distance, as considered in the direction of travel of the vehicle, in front of the lowest point of the lower brush roller 13. The sweepings are able to be taken up through intake opening 100 by the lower sweeping brush roller 13, a process that is facilitated by the presence of a guide in front of the intake opening consisting of elastic side bars 16 at the ends of an intake bar 17 extending in the transverse direction of the vehicle and a rear stop bar 17a. The brush rollers 12 and 13 cooperate with each other through a transfer opening 101 which connects the housing component 14 of the lower brush roller 13 with the housing component 15 of the upper brush roller 12. The opening 102 into the container 6 for the transfer of sweepings thereinto by the pickup device 2 is surrounded by a connection frame 18 which in the operational state of the machine tightly rests against the end frame within the support assembly 8 of the vehicle 1.

Furthermore, each housing component of the respective brush rollers is made up of a lower part 14a and 15a, respectively, and of an upper part 14b and 15b, respectively. The lower part 14a of the lower housing 14 is fixedly secured in a basic frame, which is pivotally joined to the vehicle 1 in a manner that will be described below. The upper part 14b of the lower housing 14 and the lower part 15a of the upper housing 15 together form a structural unit, whose parts 14b and 15a are joined with each other by way at the transfer opening 101 and at the lower end its lower part 14b has a surrounding flange 14d by way of which the unit bears on an upper flange 14e of the lower part 14a. The lower part 14a on the one hand and the unit made up of the parts 14b and 15a on the other are detachably joined together by screws 14f, which are placed in screw holes in the flanges 14d, 14e and then screwed up tight. The upper part 15b is mounted on the unit made up of the parts 14b and 15a by means of flanges 15c, 15d that are detachably jointed together so that the two parts are fixed in relation to each other. Apart from the transfer opening 101 and the pickup opening 100 the two brush rollers are relatively closely surrounded by the housings 14 and 15. For servicing and for removal and replacement of the upper brush roller 12 it is possible for the upper part 15b to be dismounted after disconnecting the screw connections. For servicing or removal and replacement of the lower brush roller 13 it is also necessary to remove the unit made up of the parts 14b and 15c.

The coupling linkage uniting the motor vehicle 1 with the pickup device 2 comprises respective sets of parallel arrays with links 19 and 20 on each side of the vehicle, which links are pivotably connected at their rear ends to the housings 11 which is suitably reinforced by coupling hooks 21 and 22 and at their front ends to the basic frame of the pickup device 2. The respective lower links 20 have hydraulic cylinders 23 so that they may be pivoted in a vertical direction in order to power-shift the pickup device 2 vertically in relation to the vehicle 1, whereas the upper links 19 are able to be freely adjusted vertically within the limits of a respective chain 24. If it is not desired to have means allowing a rapid coupling and uncoupling between the vehicle 1 and the pickup device 2, it is possible for the coupling hooks 21 and 22 (which hook onto suitable means on the vehicle) to be replaced by members with perforated lugs which may be joined to correspondingly perforated lugs on the vehicle by inserting pins through them.

In both cases, the design of the parallel link arrays is important. As a general point, each upper link 19 is shorter than the lower link 20 and in the operational setting, each lower link 20 has a lesser inclination with respect to the surface of the street than the upper link 19. The length and inclination of the links 19 and 20 are to be determined taking the following into account.

As will be described below, the two wheels 26 of the pickup device 2 are mounted so that they may be vertically adjusted within certain limits. Owing to the presence of the connecting links 19, 20 the pickup device 2 and the vehicle may shift relatively to each other, for example because of unevenness of the road surface. Such relative motion is not impeded by the links 19 and 20, which whatever their position transmit the tractive effort of the vehicle to the pickup device. Within the limits of such relative motion, however, the vehicle and the pickup device 2 are to be able to move pore and aft and vertically in relation to each other. This is desired because then the pickup device 2 always has its surrounding frame resting on the frame 18 surrounding the intake opening 102 of the container 6, it being possible to have an open-pored rubber foam strip between the two frames if desired. In a second range of motion caused by the application of power to the pickup device 2 in relation to the vehicle in an upward direction, the links 19 and 20 cause the pickup device to be moved upwards in relation to the vehicle 1 while at the same time, however, it is moved away from the vehicle in the longitudinal direction of the vehicle 1 in order to lead to the formation of a gap between the two said frames. When the upper end of this range of motion has been reached the container 6 is able to be tipped sideways for emptying it without being obstructed by the pickup device 2.

The running gear of the pickup device 2 includes a middle front support wheel 26a which is swivel mounted in a fork, 26b which is able to rock about a level axis and may be latched in two end positions. In one end position, the supporting wheel 26a is rocked upwards so that it is no longer in contact with the road and will not obstruct the picking up of the sweepings. In the other end position, the supporting wheel 26a bears on the street surface, the pickup device 2 is supported by the supporting wheel 26a and the two further wheels 26 on the street and the pickup device 2 may be uncoupled from the vehicle 1 and be maneuvered into a suitable position as a unit separate from the vehicle.

Figure 3:
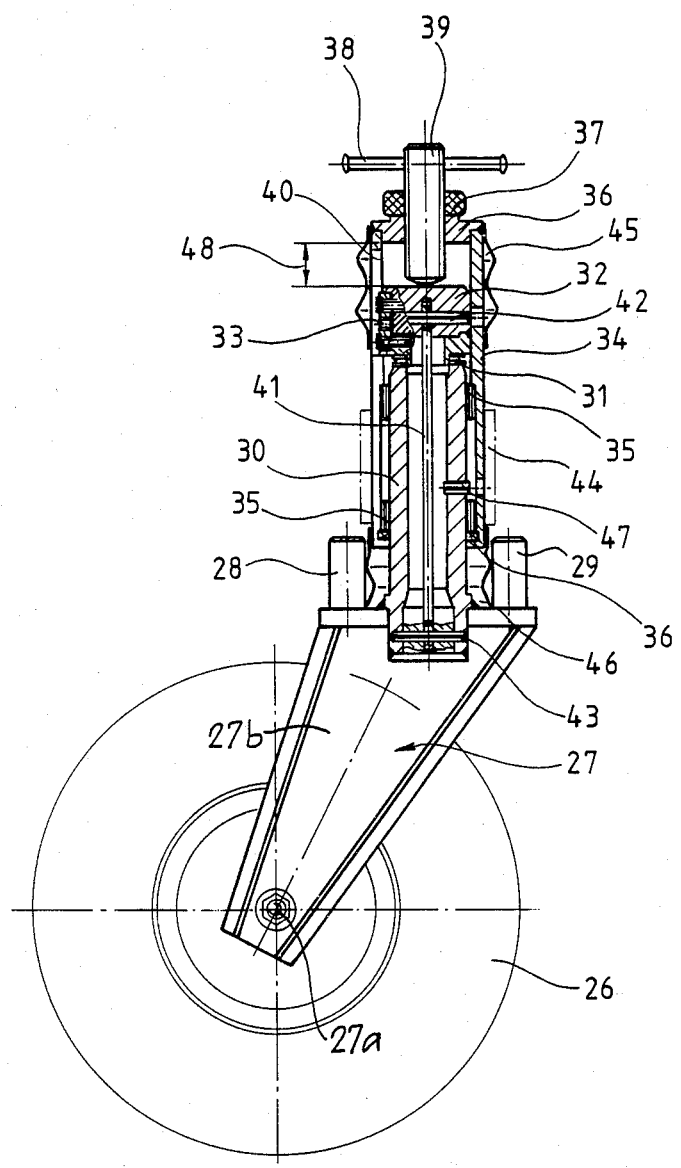
FIGS. 3 and 4 are sectional views which show separate details of construction of the apparatus.

The two wheels 26 are able to rotate about a common horizontal axis, to be rocked about respective upright axes and to be adjusted in a vertical direction. The construction of one of the mountings of these two wheels, which are identical, is seen in FIG. 3. The respective wheel 26 is supported in a bearing 27a at the lower end of one of two limbs 27b of a fork 27, which limb extends at an oblique angle to the vertical. The fork 27 is supported for rotation about a vertical axis. Abutments 28 and 29 are secured to the top end of the fork to cooperate with stops (not shown) to limit the range of possible rocking of the fork about the vertical axis. At its top end, the fork is welded to the lower end of a tube 30 arranged symmetrically with respect to the vertical axis. A headpiece 32 is supported by way of a thrust bearing 31 on the top end of the tube 30. The headpiece 32 is prevented from swiveling in an outer tube 34 by means of a screw-locked key 33. The tube 30 is mounted in plain bearings 35 in the outer tube 34. An annular gap between the outer tube 34 and the inner tube 30 is closed off at the lower end by a sealing ring 36. At the top end the outer tube 34 is shut off by a cap 36 welded onto it, on whose top side there is a nut 37. A thrust screw 39 is screwed into the nut 37 and is provided with a handle 38. The thrust screw 39 causes the key 33 to bear against the lower edge of an opening 40 in the outer tube 34 so that the headpiece 32 is axially locked in relation to the outer tube 34. A torsion rod 41 has a top end locked in the headpiece 32 by means of a cotter pin 42 while its lower end is locked in the inner tube 30 by means of a cotter pin 43. The outer tube 34 is mounted in the frame of the pickup device 2 by means of a bracket 44. There are rubber boots 45 and 46 to cover the parts of the arrangement which are covered and uncovered when the inner tube is moved in and out of the outer tube and related parts. A pin 47 in inner tube 30 can be engaged in an aperture in outer tube 34 to prevent the inner tube from dropping out of the outer tube.

The torsion rod 41 is installed so as to be free of twist when the wheel 26 is exactly headed in the direction of travel. If the wheel is deflected by external transverse forces (that is to say, rocked about the longitudinal axis of the torsion rod 41 and of the tubes 30 and 34), the torsion rod will be tensioned in one or the other direction of twisting and will return the wheel back into its initial position after application of the transverse force has ceased. By shifting the headpiece 32 in relation to the outer tube 34 within the range 48 of adjustment, the distance of the frame of the pickup from the level of the street may bbe set as desired to take up wear of the lower brush roller 12. This wheel mount construction in accordance with the invention is simple to attach, is reliable in operation and may be adjusted when desired.

The arrangement for mounting the rear stop bar 17a of the means for scooping up the sweepings at the intake opening of the lower part 14a of the lower housing 14 is of particular significance. This bar 17a is made of rubber in order to conform with the surface of the street despite small bumps therein. It has an arcuate shape so that it fits into the arcuate or cylindrical form of the lower part 14a. In order not to be damaged by large bumps in the street surface it is able to swing about a transverse shaft 49 through 360° and when it has been deflected by such a bump it is able to return and adapt itself to the outline of the lower part 14a. The pivoting range of 360° is made possible by the asymmetric arrangement of the transverse shaft 49 in relation to the length of the bar 17a so that the external force which causes the bar to be deflected, acts on the shorter one of two lever arms.

Figure 4:
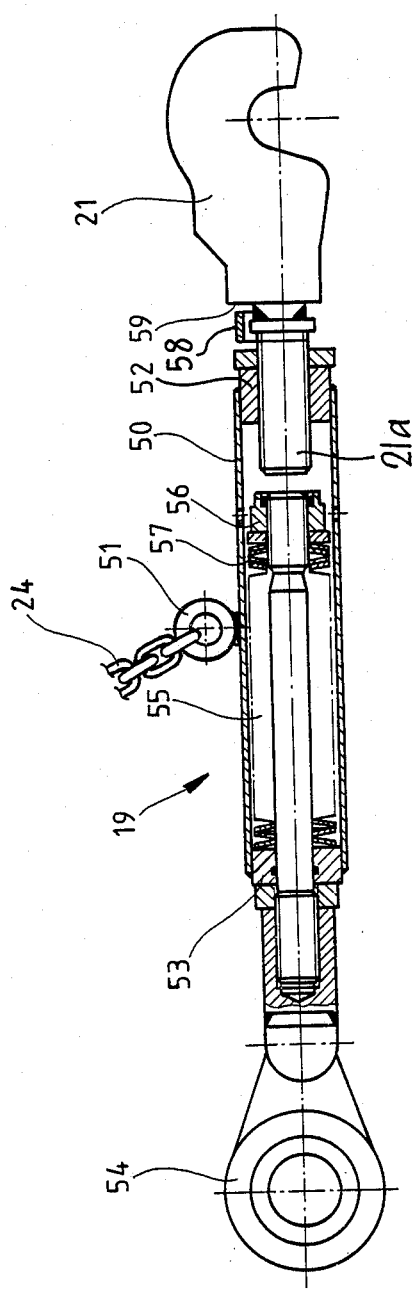

Each upper link 19 is as seen from FIG. 4, in the form of a telescoping arrangement with an internal spring. The housing 50 of the arrangement is supported by the chain 24 and for connection therewith it has a connecting eye link 51. The ends of the housing 50 are closed by respective end caps 52 and 53. The coupling hook 21 has a threaded shank 21a which is screwed into the front end cap 52. The hook may take the form of an eye in order to simplify construction. The rear end of the link 19 is in the form of an eye 54 which is attached to the pickup device 2. This eye 54 is attached to a rod 55 which extends through the cap 53 so as to be able to slide in relation therein in the length direction and the end of the rod 55 within the housing 50 has a stop 56 for engaging a spring 57 which is placed between the stop 56 and the end cap 53. The spring 47 is in the form of a stack of belleville washers which even in the retracted condition of the rod 55 are compressed somewhat in order to ensure that the link 19 has the necessary length to allow the pickup device 2 to move parallel to itself a certain amount in relation to the vehicle, as has been described earlier. If the pickup device 2 is moved a distance vertically in order to be shifted clear of the vehicle at the same time, the tension is increased so that there is a tendency for the upper links 19 to be shortened and to keep the pickup device 2 engaged with the vehicle. In order when detaching the pickup device 2 from the vehicle not to cause excessive shortening of the upper links 19 owing to relaxing the remaining tension and for attachment using a substantial degree of force while restoring the original degree of tension, which is equal to the above residual tension, so that there is a return to the original length, the device has a horseshoe-like shim 58. For detachment of the pickup device 2 from the vehicle 1, spacer shim 58 is placed between the end cap 52 of the housing 50 and a shoulder 59 on the coupling hook 21 in order to preclude any shortening of the link to be less than the length when fitted.

The drive of a the brush rollers 12, 13 is taken from a PTO shaft 60 extending from the vehicle transmission. The PTO shaft drives a chain drive 61 having a suitable transmission ratio, the central chain sprocket wheels being driven at one end of the chain drive by the PTO shaft while the outer sprocket wheels at the other end of the chain drive are responsible for driving the brush rollers. Such a chain drive may be provided at both ends of the brush or sweeping rollers but in some circumstances just one single chain drive placed at the one end of the brush rollers will suffice. In place of the PTO shaft it is possible to have another form of drive, as for instance one including a hydraulic motor running on the pressure of the vehicle's hydraulic system. Furthermore, in place of the drain drive, another form of mechanical drive may be employed, as for instance a gear drive.

The frame 18 placed around the intake opening 62 in the back wall of the sweepings container may be placed on the outer side of the back wall or on the inner side thereof. The first possibility offers the advantage of a smooth inner container wall surface and this facilitates emptying the container. The latter possibility presents a more attractive appearance.

We claim:

1. A street sweeping apparatus comprising a sweeping device for sweeping a street surface to collect sweepings thereon, a container for the collected sweepings, a pickup device for propelling the sweepings from the street surface into the container, a motor vehicle supporting said sweeping device and container for transport therewith, the motor vehicle having a drive means, said pickup device being an independent unit, means detachably connecting said pickup device to said vehicle for transport therewith, said pickup device comprising a housing having a lower inlet opening at the level of the street and an upper outlet opening, said container having an inlet opening which communicates with the outlet opening of said housing when the pickup device is connected to the vehicle, said pickup device further comprising intermeshing sweeping rollers rotatably supported in said housing for taking up the sweepings and feeding the same into said containers, said intermeshing sweeping rollers comprising two superimposed brushes in said housing and a power take-off means for driving said brushes from the drive means of the vehicle.

2. A street sweeping apparatus as claimed in claim 1 wherein said sweeping device comprises a pair of brushes rotatable in opposite directions about respective vertical axes of rotation and arranged symmetrically relative to a longitudinal median plane of the vehicle.

3. A street sweeping apparatus as claimed in claim 2 wherein said vehicle comprises a cab for a driver, a water tank between said cab and said container, said tank having an outlet above the level of the street surface and facing the same in the region of said brushes.

4. A street sweeping apparatus as claimed in claim 1 wherein said container comprises a frame surrounding said inlet opening of the container, said housing including a further frame which is pressed against the frame on the container when the pickup device is connected to the vehicle.

5. A street sweeping apparatus as claimed in claim 4 wherein said pickup device includes elastic means for resiliently pressing the frame on the housing against the frame on the container.

6. A street sweeping apparatus as claimed in claim 1 wherein said pickup device includes two wheels for resting on the street surface and a third wheel which is retractable when the pickup device is connected to the vehicle and is operative to rest on the street surface when the pickup device is disconnected from the vehicle.

7. A street sweeping apparatus as claimed in claim 6 comprising support means on said pickup device for said two wheels, said support means enabling the respective wheels to rotate around respective vertical axes and a torsion rod elastically opposing rotation of the wheels.

8. A street sweeping apparatus as claimed in claim 7 wherein said support means comprising a fork rotatably supporting the wheels, a support frame rotatably supporting the fork, an inner tube fixed to said fork, an outer tube fixed to said frame and rotatably receiving said inner tube, an abutment supported in said outer tube for axial travel therein but without capability of relative rotation, said abutment resting rotatably on said inner tube, said torsion rod having one end fixed to said abutment and a second end fixed to said inner tube.

9. A street sweeping apparatus as claimed in claim 8 wherein said support means further comprises an end cap for said outer tube, a rotatable thrust member threaded in said end cap and in contact with said abutment to axially displace the abutment as the thrust member is rotated, a thrust bearing between said abutment and said inner tube and plain bearings between said inner and outer tubes.

10. A street sweeping apparatus as claimed in claim 1 comprising linkage means including parallel linkages for detachably connecting the housing to the container, said linkages each including two links each having a front end detachably connectable to said vehicle and a rear end pivotably connected to said housing, said links being dimensioned and arranged to provide a vertical movement of the housing relative to the container in a first portion of a path of travel of the housing and a horizontal movement of the housing away from the container in a further portion of the path of travel.

11. A street sweeping apparatus as claimed in claim 10 comprising actuator means for acting on one of the links of the linkages to move the housing along said path of travel, the other of the links of the linkages being telescopic.

12. A street sweeping apparatus as claimed in claim 11 wherein said other of the links which is telescopic comprises first and second connectors respectively at the front and rear ends of said other links, a sleeve connected to one of said connectors and a rod connected to the other of said connectors, said rod being slidable in said sleeve to provide telescopic operation of said other link and spring means between said rod and sleeve opposing telescopic extension of said other link, said spring means having a pre-tension in an unstressed condition of said other link, and means to maintain the pre-tension of said spring means when the pickup device is detached from said vehicle.

13. A street sweeping apparatus as claimed in claim 1 wherein said housing includes part cylindrical housing portions respectively partially surrounding said rollers.

14. A street sweeping apparatus as claimed in claim 13 wherein said part cylindrical housing portions include upper and lower housing components, each having a respective one of said sweeping rollers mounted therein, the lower housing component including an upper part secured to the upper housing component, a lower part detachably connected to said upper part said lower inlet opening of said housing being in said lower part, guide means in said lower part for entry of sweepings into said housing including a take-up bar extending transversely of the vehicle at the front of said inlet opening, two slide plates supporting said take-up bar and extending longitudinally of the vehicle, and a rear sweeping bar.

15. A street sweep apparatus as claimed in claim 14 wherein said sweeping bar depends from said lower component and extends transversely of the pickup device.

16. A street sweeping apparatus as claimed in claim 15 wherein said sweeping bar is made from rubber and extends in continuation from said lower component towards the street surface.

17. A street sweeping apparatus as claimed in claim 1 wherein said superimposed brushes have parallel axes of rotation extending transversely of the vehicle.

* * * * *